United States Patent
Shirakawa et al.

(10) Patent No.: US 7,162,860 B2
(45) Date of Patent: Jan. 16, 2007

(54) DIAGNOSIS SYSTEM OF EXHAUST AFTERTREATMENT APPARATUS FOR INTERNAL COMBUSTION ENGINE

(75) Inventors: Takashi Shirakawa, Yokohama (JP); Manabu Miura, Kanagawa (JP); Kousuke Yasuhara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 132 days.

(21) Appl. No.: 10/814,602

(22) Filed: Apr. 1, 2004

(65) Prior Publication Data

US 2004/0250609 A1 Dec. 16, 2004

(30) Foreign Application Priority Data

Apr. 2, 2003 (JP) ............................. 2003-099656

(51) Int. Cl.
*F01N 3/00* (2006.01)
(52) U.S. Cl. .......................................... 60/277; 60/295
(58) Field of Classification Search .................. 60/277, 60/295
See application file for complete search history.

(56) References Cited

U.S. PATENT DOCUMENTS

| | | | | |
|---|---|---|---|---|
| RE28,051 E | * | 6/1974 | McDermott | 418/61.2 |
| 5,279,116 A | * | 1/1994 | Shimizu et al. | 60/277 |
| 5,416,710 A | | 5/1995 | Kuroda et al. | |
| 5,448,886 A | | 9/1995 | Toyoda | |
| 5,602,737 A | | 2/1997 | Sindano et al. | |
| 6,467,254 B1 | * | 10/2002 | Cullen et al. | 60/274 |
| 6,594,985 B1 | * | 7/2003 | Surnilla et al. | 60/277 |
| 6,637,198 B1 | * | 10/2003 | Hertzberg | 60/295 |
| 6,640,540 B1 | * | 11/2003 | Sato et al. | 60/297 |
| 6,813,884 B1 | * | 11/2004 | Shigapov et al. | 60/295 |
| 2002/0046562 A1 | * | 4/2002 | Allansson et al. | 60/278 |
| 2002/0053202 A1 | * | 5/2002 | Akama et al. | 60/297 |
| 2003/0115854 A1 | * | 6/2003 | Tamura et al. | 60/277 |

FOREIGN PATENT DOCUMENTS

| | | |
|---|---|---|
| EP | 0 636 771 A1 | 2/1995 |
| EP | 0 796 985 A1 | 9/1997 |
| EP | 0 961 013 A2 | 12/1999 |
| EP | 1 081 348 B1 | 3/2001 |
| JP | 7-279718 A | 10/1995 |
| JP | 8-177469 A | 7/1996 |
| JP | 10-121943 A | 5/1998 |
| JP | 2001-73747 A | 3/2001 |
| JP | 2002-38929 A | 2/2002 |

* cited by examiner

*Primary Examiner*—Thomas Denion
*Assistant Examiner*—Loren C. Edwards
(74) *Attorney, Agent, or Firm*—Foley & Lardner LLP

(57) ABSTRACT

A diagnosis system of an exhaust aftertreatment apparatus for an internal combustion engine is arranged to execute a first deterioration diagnosis of the exhaust aftertreatment apparatus on the basis of a change of a catalyst downstream side air/fuel ratio relative to a change of a catalyst upstream side air/fuel ratio during a rich spike control and to execute a second deterioration diagnosis from an inversion cycle of a feedback quantity during the feedback control of the catalyst downstream side air/fuel ratio during a stoichiometric control when the first deterioration diagnosis made a deterioration determination.

14 Claims, 14 Drawing Sheets

(FIRST DIAGNOSIS)

(SECOND DIAGNOSIS)

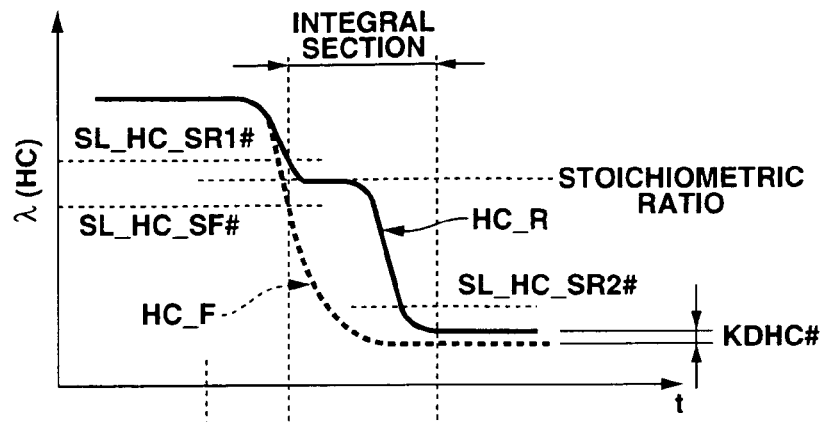
FIG.9A
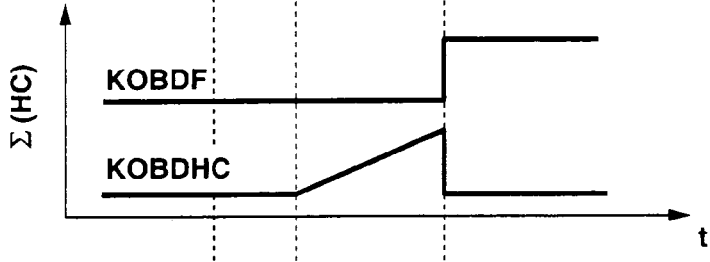
FIG.9B
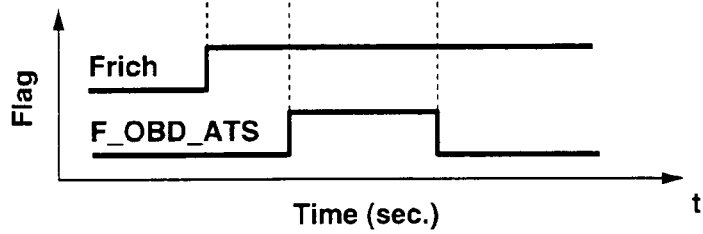
FIG.9C
FIG.10
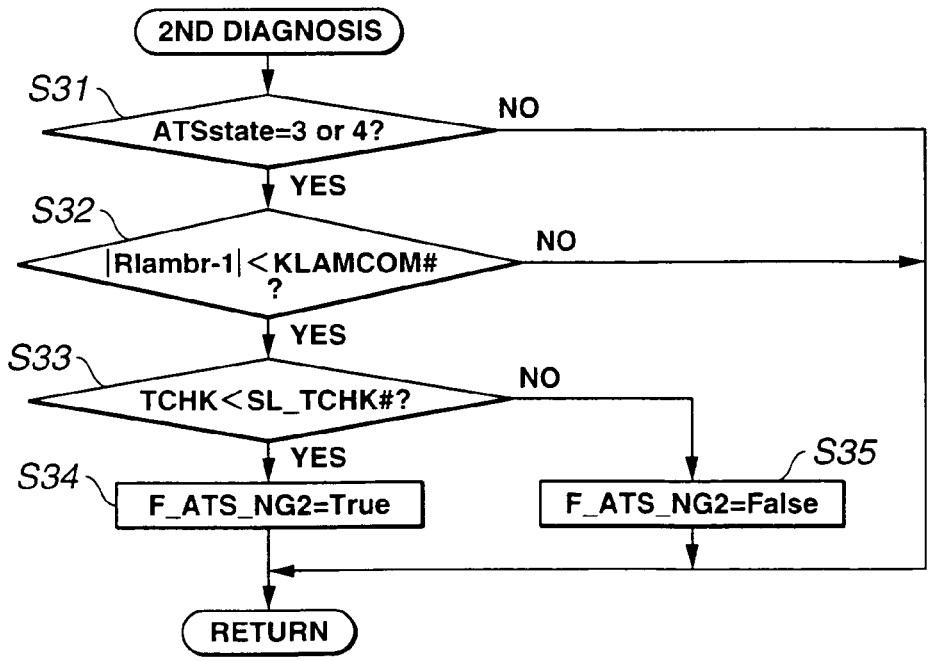

PUMP CURRENT→λ CONVERSION TABLE

FUEL INJECTION CHARACTERISTIC MAP

VOLUMETRIC EFFICIENCY
BASIC MAP

VOLUMETRIC EFFICIENCY
CORRECTION TABLE

AFM VOLTAGE-FLOWRATE CONVERSION TABLE

DIAGNOSIS SYSTEM OF EXHAUST AFTERTREATMENT APPARATUS FOR INTERNAL COMBUSTION ENGINE

BACKGROUND OF THE INVENTION

The present invention relates to an exhaust aftertreatment apparatus for an internal combustion engine, and more particularly to a diagnosis system of the exhaust aftertreatment apparatus.

In case of a lean-burn engine capable of combusting air-rich mixture, an adsorption and oxidization type NOx catalyst (NOx trap catalyst) is mostly provided in an exhaust passage of the engine to purify (deoxidize) nitrogen oxide (NOx) in exhaust gas. Such a NOx trap catalyst adsorbs NOx in exhaust gas when an air-fuel ratio in exhaust gas is high (lean), and desorbs and deoxidizes the trapped NOx when the air-fuel ratio is low (rich). Due to the limitation of the adsorbing capacity of NOx trap catalyst, it is necessary to desorb and deoxidize the trapped NOx at a proper timing before the adsorbing capacity is saturated. Therefore, a known exhaust aftertreatment apparatus is arranged to execute a rich spike control of temporally lowering the exhaust air/fuel ratio as disclosed in Japanese Published Patent Application No. 7-279718.

On the other hand, there is a need of accurately detecting the abnormality of a NOx trap catalyst to maintain the high exhaust purifying efficiency. In order to satisfy such a need, Japanese Published Patent Applications No. 2002-38929 and 2001-73747 discloses a diagnosis method of measuring an exhaust air/fuel ratio during the rich spike control and diagnosing a deterioration of the NOx trap catalyst on the basis of a time period during when the measured exhaust air/fuel ratio is maintained at ratios near the stoichiometric air/fuel ratio.

Further, Japanese Published Patent Application No. 10-121943 discloses a diagnosis method of measuring an inversion cycle of an output of an $O_2$ sensor during a feedback control of an air/fuel ratio of mixture supplied to the engine according to the output of the $O_2$ sensor disposed downstream of the catalyst, and of diagnosing the deterioration of the catalyst from the measured inversion cycle.

SUMMARY OF THE INVENTION

However, these diagnosis methods have problems in accuracy. For example, since the former method is arranged to diagnose then deterioration of the catalyst by measuring a time period $\Delta T$ during which the downstream side air/fuel ratio (outlet $\lambda$) is maintained at ratios near the stoichiometric air/fuel ratio and by comparing the time period $\Delta T$ with a threshold, there is a possibility that the erroneous diagnosis is made for the reasons that the time period $\Delta T$ maintained at ratios near the stoichiometric air/fuel ratio varies if the control of the air/fuel ratio during the rich spike control fluctuates, as shown in FIGS. 22A and 22B.

Although it is important to improve the control accuracy of the air/fuel ratio control during the rich spike control, there is a limiting in this improvement due to the short period such as several seconds of the rich spike control. Accordingly it is necessary to execute the diagnosis on the assumption that this diagnosis always includes a predetermined air/fuel ratio control error.

On the other hand, in case that the latter method of diagnosing the deterioration of the catalyst using the inversion cycle is employed in a compression ignition engine such as a diesel engine, since the engine is not normally operated at air/fuel ratios near the stoichiometric air/fuel ratio and is executed at a lean burn condition, the fuel consumption is degraded by the execution of this deterioration diagnosis executed at air/fuel ratios near the stoichiometric air/fuel ratio. Accordingly, in case that the compression ignition engine is operated at air/fuel ratios near the stoichiometric air/fuel ratio, it is difficult to suppress the generation of exhaust particulate contaminants due to the non-equivalent state of air-fuel mixture. This shortens the recovery interval of the exhaust particulate filter (DPF) and the fuel consumption is also degraded thereby.

It is therefore an object of the present invention to provide a diagnosis system which is capable of accurately diagnosing the deterioration of an exhaust aftertreatment apparatus while suppressing the degradation of fuel consumption.

An aspect of the present invention resides in an exhaust-aftertreatment-apparatus diagnosing system for an internal combustion engine comprising: an exhaust ambience varying section varying a ratio between an oxidizing agent and a reducing agent in exhaust gas of the engine; an exhaust aftertreatment apparatus disposed in an exhaust passage of the engine, the exhaust aftertreatment apparatus selectively executing an adsorbing operation and a reducing operation of the exhaust gas according to the ratio; a first exhaust ambience detector disposed upstream of the exhaust aftertreatment apparatus, the first exhaust ambience detector detecting a first ratio between the oxidizing agent and the reducing agent of the exhaust gas upstream of the exhaust aftertreatment apparatus; a second exhaust ambience detector disposed downstream of the exhaust aftertreatment apparatus, the second exhaust ambience detector detecting a second ratio of the oxidizing agent and the reducing agent of the exhaust gas downstream of the exhaust aftertreatment apparatus; a first deterioration diagnosing section diagnosing a deterioration of the exhaust aftertreatment apparatus on the basis of the first and second ratios obtained under a first engine operating condition under that the exhaust ambience is changed; and a second deterioration diagnosing section diagnosing the deterioration of the exhaust aftertreatment apparatus on the basis of the first and second ratios obtained under a second engine operating condition when the first deterioration diagnosing section diagnoses that the exhaust aftertreatment apparatus is deteriorated.

Another aspect of the present invention resides in a method of diagnosing an exhaust aftertreatment apparatus for an internal combustion engine, the exhaust aftertreatment apparatus being disposed in an exhaust passage of the engine and purifying exhaust gas of the engine according to a ratio between an oxidizing agent and a reducing agent in the exhaust gas, which is varied by an exhaust ambience varying section, the method comprising: an operation of detecting a first ratio between the oxidizing agent and the reducing agent of the exhaust gas upstream of the exhaust aftertreatment apparatus; an operation of detecting a second ratio of the oxidizing agent and the reducing agent of the exhaust gas downstream of the exhaust aftertreatment apparatus; an operation of executing a first diagnosis for diagnosing a deterioration of the exhaust aftertreatment apparatus on the basis of the first and second ratios obtained under a first engine operating condition under that the exhaust ambience is changed; and an operation of executing a second diagnosis for diagnosing the deterioration of the exhaust aftertreatment apparatus on the basis of the first and second ratios obtained under a second engine operating condition when the first deterioration diagnosing section diagnoses that the exhaust aftertreatment apparatus is deteriorated.

The other objects and features of this invention will become understood from the following description with reference to the accompanying drawings.

BRIEF DESCRIPTION OF THE DRAWINGS

FIGS. 9A, 9B and 9C are graphs explaining the first deterioration diagnosis of FIG. 8.

FIG. 10 is a flowchart showing a second deterioration diagnosis executed at step S5 in FIG. 6.

DETAILED DESCRIPTION OF THE INVENTION

Figure 1:
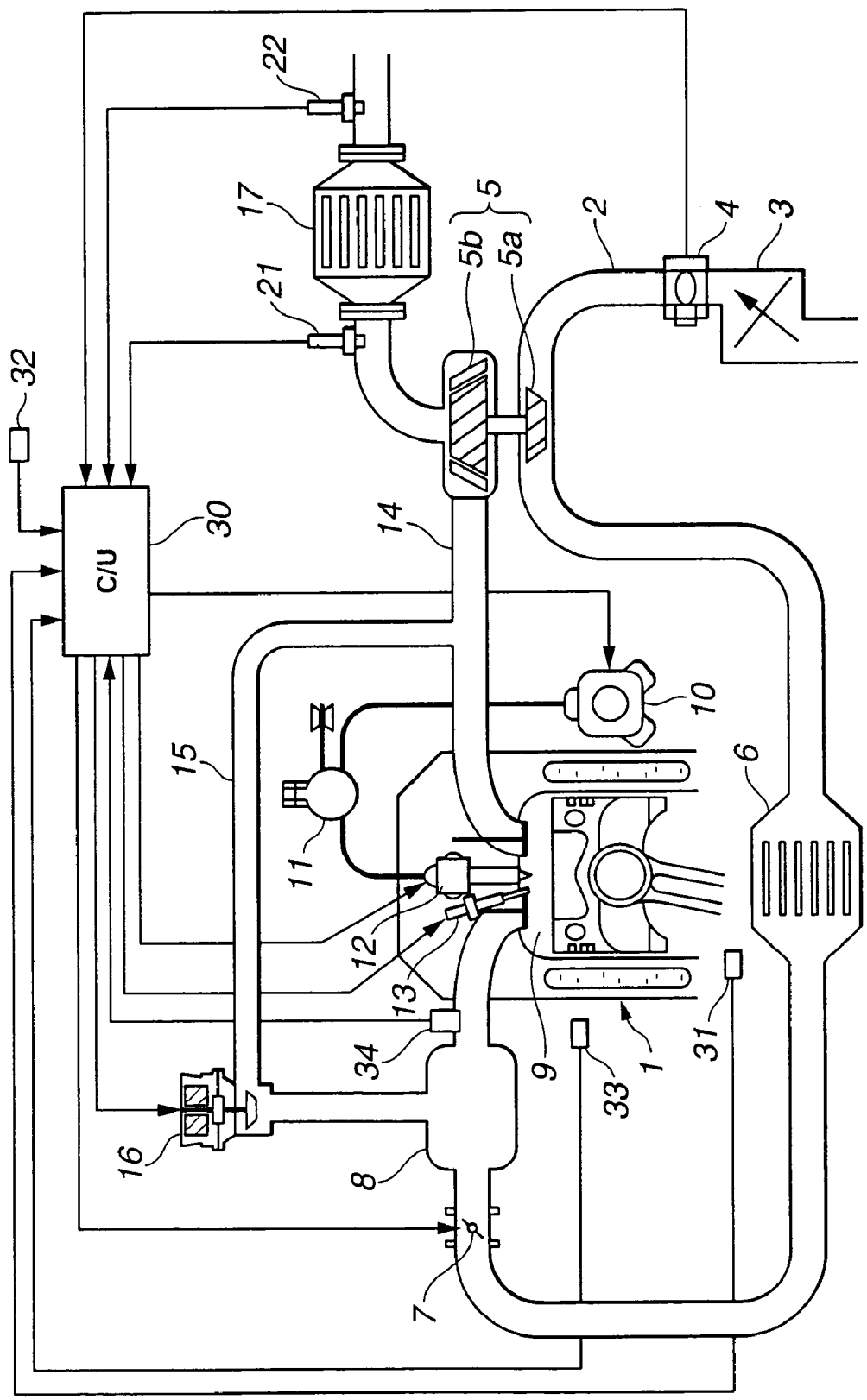
FIG. 1 is a system view showing a diagnosis system of an embodiment according to the present invention.

Referring to the drawings, there is discussed an embodiment of a diagnosis system of an exhaust aftertreatment apparatus according to the present invention, with reference to the drawings. FIG. 1 is a schematic diagram showing an embodiment of the diagnosis system for the exhaust aftertreatment apparatus adapted to an internal combustion engine (diesel engine) according to the present invention.

Provided in an intake passage 2 of a diesel engine 1 are an air cleaner 3, an airflow meter 4, an intake air compressor 5a of a turbocharger 5, an intercooler 6, an intake air throttle valve 7 and a collector 8, in the order of mention from an upstream side to engine 1. Accordingly, intake air entered through air cleaner 3 is measured by airflow meter 4, compressed by intake air compressor 5a of turbocharger 5, cooled by intercooler 6, and controlled in quantity by intake air throttle valve 7. Further, the air flows into a combustion chamber 9 of each cylinder through collector 8.

Fuel is pressurized by a common rail type fuel injection system, that is, a high pressure fuel pump 10 and is supplied to a common rail 11, and is then directly injected into each combustion chamber 9 through a fuel injector 12 for each cylinder. Air and fuel supplied into each combustion chamber 9 are properly heated by a glow plug 13 and combusted by a compression ignition. Further, exhaust gas is discharged into an exhaust passage 14.

A part of exhaust gas flowed into the exhaust gas passage 14 is returned to an intake side of engine 1 through an EGR passage 15 and an EGR valve 16 as EGR (exhaust gas recirculation) gas. The other of exhaust gas flows through an exhaust turbine 5b of turbocharger 5 to drive exhaust turbine 5b.

The exhaust aftertreatment apparatus for engine 1 is disposed downstream of exhaust turbine 5b in exhaust passage 14. The exhaust aftertreatment apparatus has a function of purifying exhaust gas by adsorbing and deoxidizing nitrogen oxides (NOx) according to a ratio between an oxide agent and a reducing agent in exhaust gas, which varies at least by an exhaust gas ambient varying means. More specifically, when the exhaust air/fuel ratio is lean, NOx in exhaust gas is trapped in a NOx trap catalyst element 17 of the exhaust aftertreatment apparatus, and when the exhaust air/fuel ratio is rich NOx trapped in NOx trap catalyst element 17 is desorbed and deoxidized at NOx trap catalyst element 17.

At the upstream side and downstream side of NOx trap catalyst element 17, there is provided air/fuel ratio sensors 21 and 22 for detecting air/fuel ratios λ (representing an excess air ratio) in exhaust gas, respectively. These upstream and downstream air/fuel ratio sensors 21 and 22 function as first and second exhaust ambience detecting means for detecting a ratio of oxidizing agent and reducing agent in exhaust gas.

Figure 2:
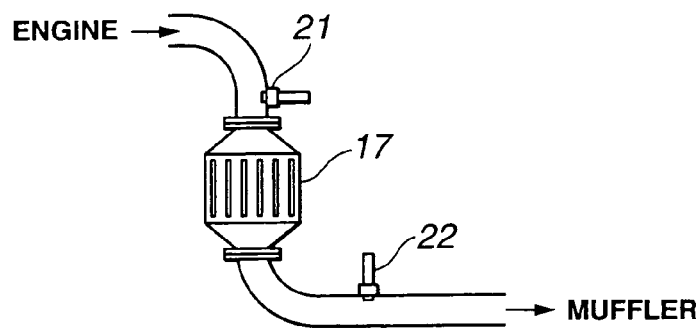
FIG. 2 is a structural view showing an exhaust aftertreatment apparatus employed in the embodiment.
Figure 3:
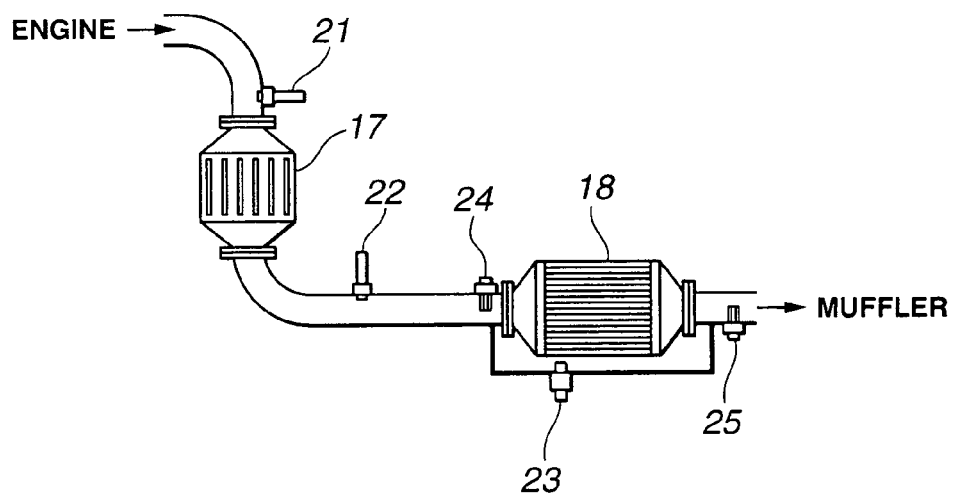
FIG. 3 is a structural view showing another exhaust aftertreatment apparatus employed in the embodiment.
Figure 4:
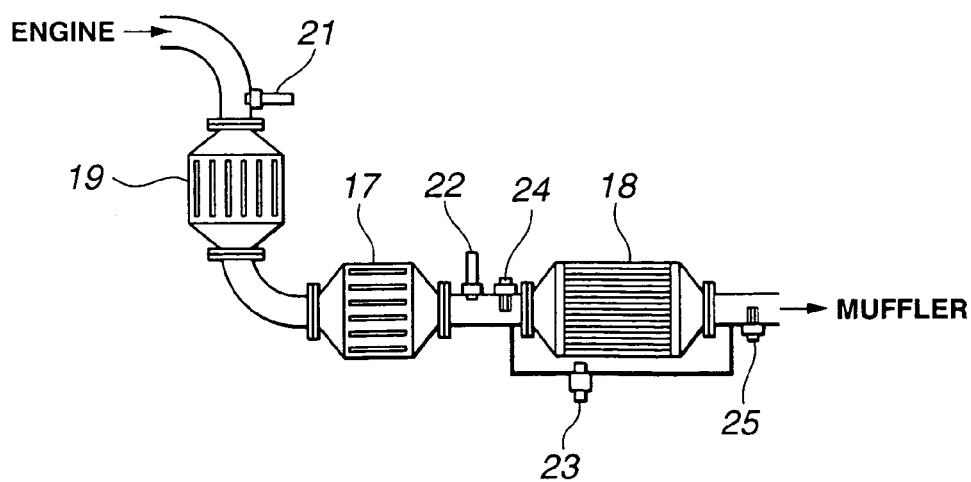
FIG. 4 is a structural view showing another exhaust aftertreatment apparatus employed in the embodiment.

The exhaust aftertreatment apparatus may be arranged, as shown in FIG. 2, such that NOx trap catalyst element 17, on which an oxidizing catalyst is supported, is independently disposed in exhaust passage so as to oxidize the exhaust composition (HC, CO) flowing through NOx trap catalyst element 17. Further, the exhaust aftertreatment apparatus may be arranged, as shown in FIG. 3, to employ NOx trap catalyst element 17 and diesel particulate trap (DPF) 18 for catching exhaust particulate contaminants (soot) which is disposed downstream of NOx trap catalyst element 17. Furthermore, the exhaust aftertreatment apparatus may be arranged, as shown in FIG. 4, such that an oxidizing catalyst 19 is separately disposed upstream of NOx trap catalyst element 17 and DPF 18 is disposed downstream of NOx trap catalyst element 17.

In case of FIG. 2 or FIG. 3, air/fuel ratio sensors 21 and 22 are disposed at an upstream side and a downstream side of NOx trap catalyst element 17, respectively. In case of FIG. 4, $O_2$ sensors 21 and 22 are disposed at an upstream side of oxidizing catalyst 19 and a downstream side of NOx trap catalyst element 17, respectively. Further, as shown in FIGS. 3 and 4, there are provided a pressure difference sensor 23 for detecting a pressure difference between an upstream side pressure and a downstream side pressure of DPF 18, and exhaust gas temperature sensors 24 and 25 for detecting exhaust gas temperatures at inlet and outlet of DPF 18.

Although the embodiment according to the present invention has been shown and described to employ wide-range type air/fuel ratio sensors 21 and 22 as first and second exhaust ambience detecting means, it will be understood that a normal $O_2$ sensor or NOx sensor may be employed instead of these air/fuel ratio sensors 21 and 22.

The embodiment according to the present invention has been shown and described so as to calculate a reducing agent quantity in exhaust gas on the basis of the air/fuel ratio sensor output (air/fuel ratio) without directly employing the air/fuel ratio sensor output (air/fuel ratio) as a parameter relating to a ratio between an oxidizing agent and a reducing agent in exhaust gas. Accordingly, the first and second exhaust ambience detecting means are constructed so as to comprise HC quantity calculating sections in addition to air/fuel ratio sensors, respectively.

Returning to FIG. 1, control unit 30 receives signals from airflow meter 4, air/fuel ratio sensors 21 and 22, an engine speed sensor 31 for detecting engine speed Ne, an accelerator opening sensor 32 for detecting an accelerator opening APO, a water temperature sensor 33 for detecting an engine water temperature Tw, and an intake air pressure sensor 34 for detecting an intake air pressure Pint, in order to control engine 1.

Control unit 30 outputs a fuel injection command signal to fuel injectors 12, a throttle opening command signal to intake air throttle valve 7 and an EGR valve opening command signal to EGR valve 16, on the basis of the received input signals. The fuel injection command signal determines a main injection of fuel injectors 12 and fuel injection quantity and an injection timing of a post injection executed after the main injection, that is, executed during an expansion stroke or exhaust stroke.

NOx trap catalyst element 17 basically stores NOx during the lean burn operating condition. However, due to the limitation of a NOx trap capacity of NOx trap catalyst element 17, it is necessary to desorb NOx stored in NOx trap catalyst element 17 and to deoxidize NOx at a proper timing before the NOx trap capacity saturates.

Control unit 30 therefore determines a recovery timing of NOx trap catalyst element 17 on the basis of an engine operation history. When control unit 30 determines that NOx trap catalyst element 17 should be recovered, a rich burn operation (rich spike control) is executed by temporally decreasing an opening of intake air throttle valve 7 or by temporally increasing the fuel injection. As a method of the rich spike control, a method shown in Japanese Published Patent Application No. 7-279718 may be employed, and it will be understood that the method of the rich spike control is not limited to this.

However, if NOx trap catalyst element 17 deteriorates, an exhaust gas purification performance will fall. Therefore, it is necessary to execute a deterioration diagnosis of the NOx trap catalyst element 17. Control unit 30 is therefore arranged to execute the deterioration diagnosis of NOx trap catalyst element by utilizing an $O_2$ storage function of NOx trap catalyst element 17. Hereinafter, there is discussed the deterioration diagnosis in detail.

The deterioration diagnosis employed in the embodiment of the present invention includes a first deterioration diagnosis which is easily executed under a normal engine operating condition, and a second deterioration diagnosis which is executed when the first deterioration diagnosis result is that the possibility of the deterioration is high, and which is capable of obtaining a high accuracy diagnosis result.

The first deterioration diagnosis is executed under a normal operating condition and when the exhaust ambience is changed to rich side or lean side, that is, when the engine operating state is changed from a lean burn operation to a rich burn operation, or changed from the rich burn operation to the lean burn operation. More specifically, when the rich spike control is executed, the first deterioration diagnosis is executed.

Figure 5A:
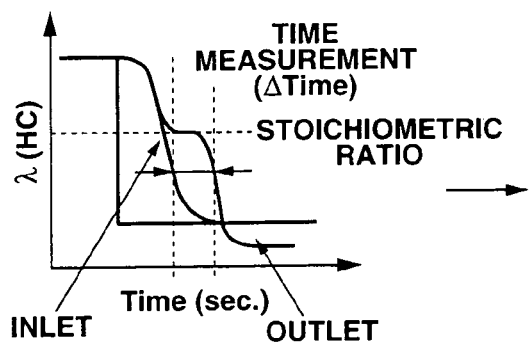
FIGS. 5A and 5B are graphs respectively explaining first and second deterioration diagnoses executed by the diagnosis system of the embodiment.
Figure 5B:
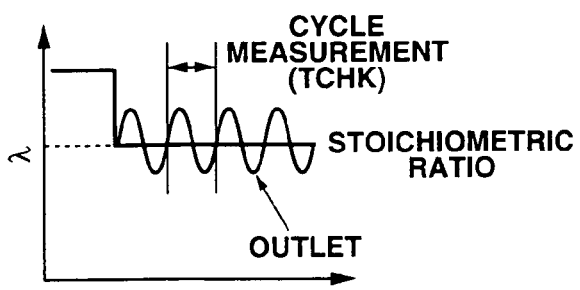

The technique of the first deterioration diagnosis is arranged to measure a time period ΔTime (shown in FIG. 22) from a first moment that the air/fuel ratio λ or HC quantity at the upstream side of catalyst 17 is changed to a predetermined value to a second moment that the air/fuel ratio λ or HC quantity at the downstream side of catalyst 17 reaches the predetermined value with reference to a graph of FIG. 5A, or to calculate an integral quantity (Σ(HC)) of a difference between the upstream side and downstream side air/fuel ratios λ or HC quantities during the time period ΔTime. Further, on the basis of the obtained time period ΔTime or the integral quantity, a deterioration of NOx trap catalyst element is diagnosed.

The second deterioration diagnosis is executed upon changing the engine operation mode to a diagnosis operation mode, that is, to the stoichiometric air/fuel ratio operating condition, when the result of the first deterioration diagnosis indicates that NOx trap catalyst element 17 is in a deterioration condition.

The technique of the second deterioration diagnosis is arranged to measure an inversion cycle TCHK of a feedback quantity (λ) during a feedback control while feedback controlling an exhaust air/fuel ratio at a value near the stoichiometric air/fuel ratio on the basis of the output of the downstream side air/fuel ratio sensor 22. Further on the basis of the obtained inversion cycle TCHK, a deterioration of NOx trap catalyst element 17 is diagnosed. The method of measuring the inversion cycle TCHK of the feedback quantity during the air/fuel ratio feedback control is commonly known, and is particularly disclosed in Japanese Published Patent Application No. 10-121943. Therefore, the explanation thereof is omitted herein.

As discussed above, the catalyst deterioration diagnosis during the rich spike control is simple. However, since this deterioration diagnosis is executed during a transient operating condition, it is difficult to obtain a diagnosis result with high accuracy. On the other hand, although in view of accuracy it is preferable to employ the method of diagnosing the deterioration on the basis of the inversion cycle of the air/fuel ratio feedback control as to the downstream side air/fuel ratio, this latter diagnosis has to be executed under the stoichiometric air/fuel ratio condition. Accordingly, the latter diagnosis is not preferable in view of fuel consumption.

Therefore, in the present invention, as the first deterioration diagnosis, a simple catalyst deterioration diagnosis executed during the rich spike control is adopted. Further, when the result of the first deterioration diagnosis executed under a condition of setting the diagnosis threshold at a relatively severe value indicative that there is a deterioration tendency of the catalyst, the second diagnosis, which is a high-accuracy deterioration diagnosis executed on the basis of the inversion cycle of the air/fuel ration feedback control at a value near the stoichiometric air/fuel ratio, is executed. By this combination of the first and second deterioration diagnoses, it becomes possible to maximally suppress the deterioration of fuel consumption and to achieve the high-accuracy deterioration diagnosis.

Figure 6:
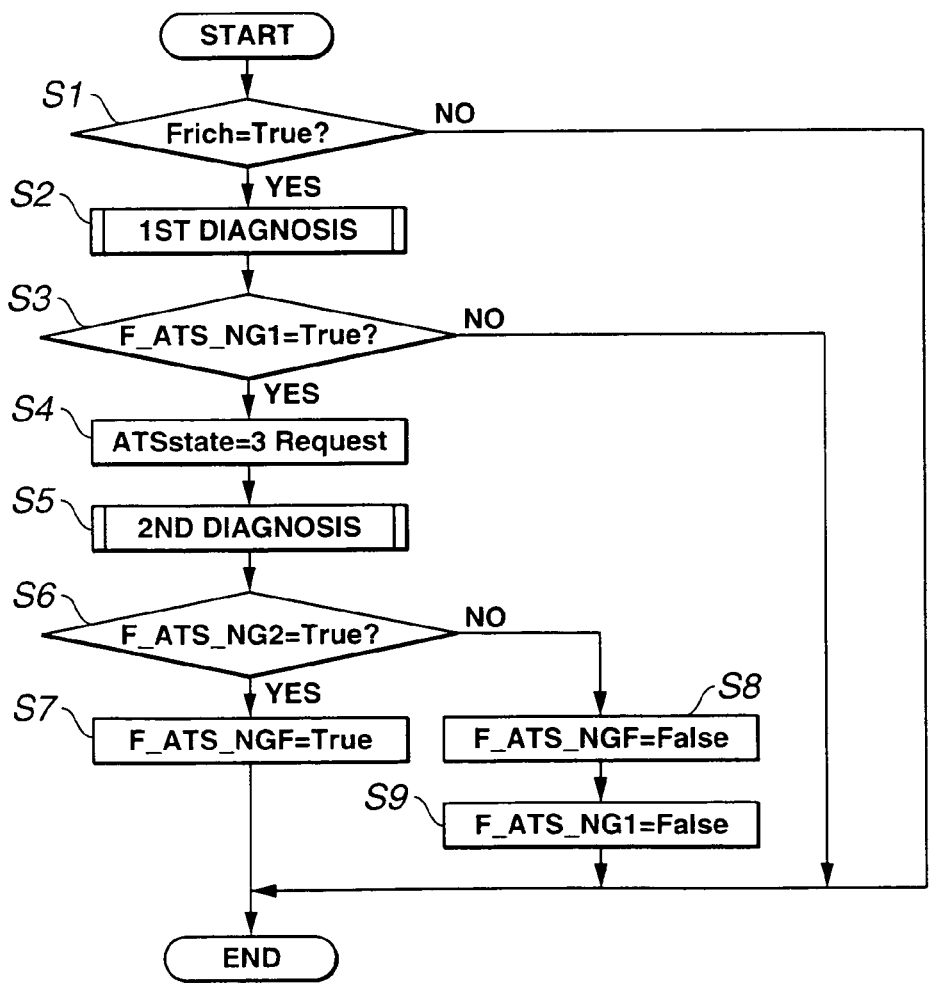
FIG. 6 is a flowchart showing a catalyst deterioration diagnosis executed in the embodiment.

Next, the details of catalyst deterioration diagnosis executed in control unit 30 are explained with reference to a flowchart. FIG. 6 is the main flowchart of the catalyst deterioration diagnosis.

At step S1 control unit 30 determines whether or not a rich spike control is now being executed by checking a flag Frich indicative of an execution state of the rich spike control for recovering NOx trap catalyst element 17. When the determination at step S1 is affirmative, that is, when flag Frich is true indicative that the rich spike control is being executed, the program proceeds to step S2. When the determination at step S1 is negative, that is, when flag Frich is false indicative that the rich spike control is not being executed, the present routine is terminated.

Figure 8:
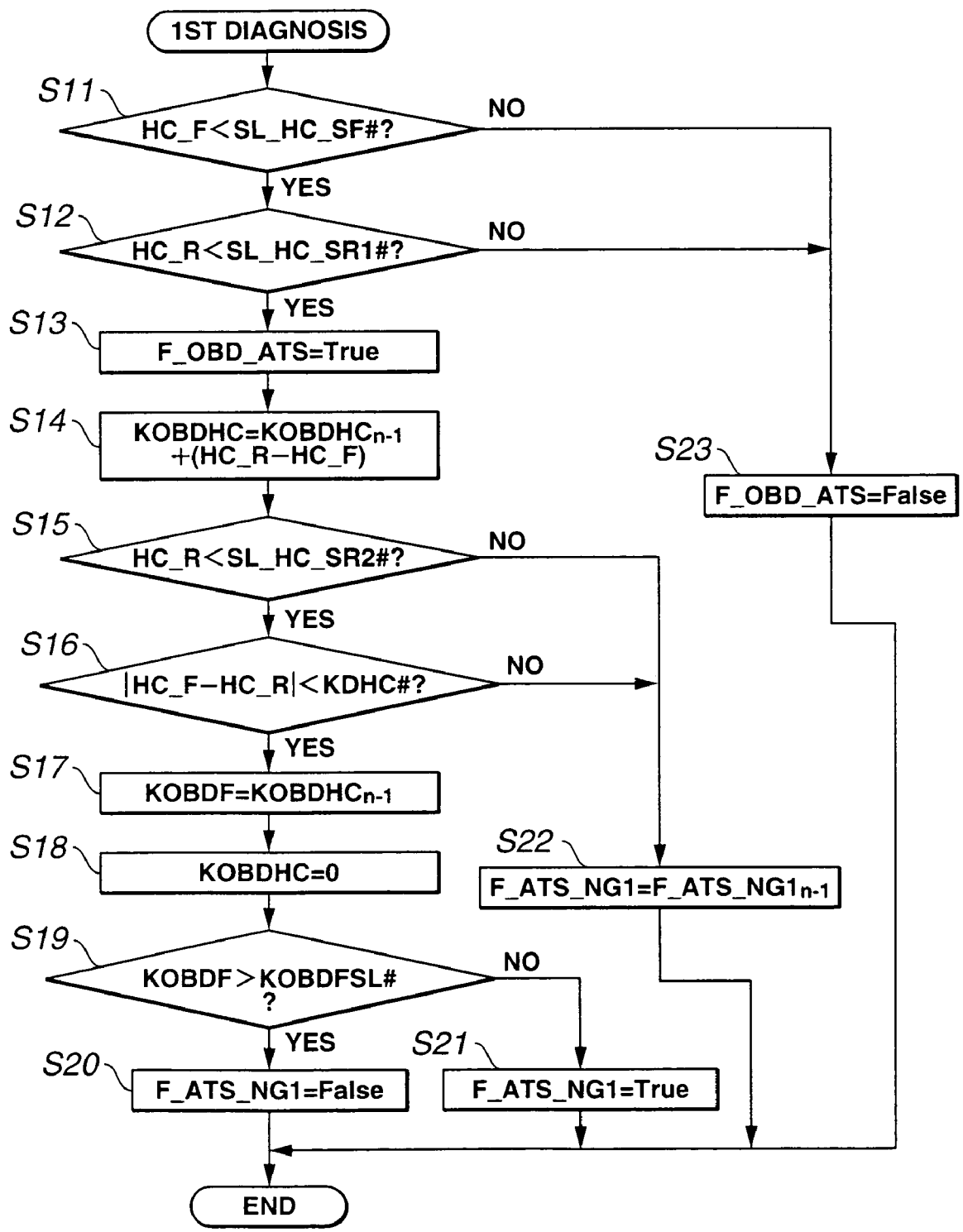
FIG. 8 is a flowchart showing a first deterioration diagnosis executed at step S1 in FIG. 6.

At step S2 control unit 30 executes the first deterioration diagnosis (1st Diagnosis) shown by a flowchart in FIG. 8 to obtain a first deterioration diagnosis result F_ATS_NG1.

At step S3 control unit 30 determines whether or not first diagnosis result F_ATS_NG1 is true. When the determination at step S3 is affirmative, that is, when first diagnosis result F_ATS_NG1 is true indicative that NOx trap catalyst element in the deteriorated condition, the program proceeds to step S4. When the determination at step S3 is negative, that is, when first diagnosis result F_ATS_NG1 is false, the present routine is terminated.

At step S4 control unit 30 sets an exhaust aftertreatment demand flag ATSstate at 3 to transit the present engine operation to the stoichiometric air/fuel ratio control for the purpose of executing a second deterioration diagnosis. The explanation of the exhaust aftertreatment demand flag ATSstate is discussed later.

At step S5 control unit 30 obtains a second deterioration diagnosis result F_ATS_NG2 by executing the second deterioration diagnosis (2nd Diagnosis) shown by a flowchart in FIG. 10.

At step S6 control unit 30 determines whether or not second diagnosis result $F_{13}ATS_{13}NG2$ is true. When the determination at step S6 is affirmative, that is, when second diagnosis result $F_{13}ATS_{13}NG2$ is true indicative that NOx trap catalyst element is in the deteriorated condition, the program proceeds to step 57 wherein control unit 30 sets an exhaust aftertreatment abnormality indicative flag $F_{13}ATS_{13}NGF$ at True ($F_{13}ATS_{13}NGF$=True) and then terminates the present routine. When the determination at step S6 is negative, that is, when second diagnosis result $F_{13}ATS_{13}NG2$ is false, the program proceeds to step S8 wherein control unit 30 sets the exhaust aftertreatment abnormality indicative flag $F_{13}ATS_{13}NGF$ at False (FATS$_{13}$NGF=False). Subsequently, the program proceeds from step S8 to step S9 wherein control unit 30 sets first deterioration diagnosis result flag $F_{13}ATS_{13}NG1$ is set at False ($F_{13}ATS_{13}NG1$=False). Then, the present routine is terminated.

Figure 7:
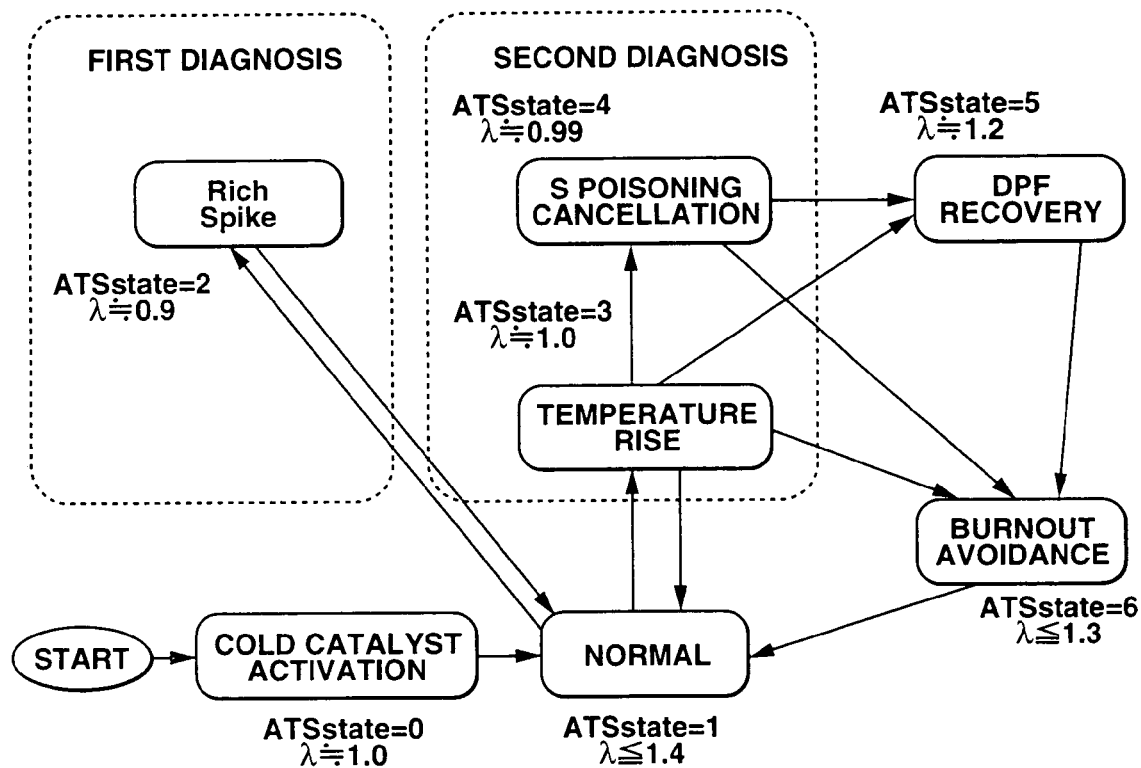
FIG. 7 is a view explaining an exhaust aftertreatment demand.

FIG. 7 shows an explanatory view for explaining the exhaust aftertreatment demand flag ATSstate. During a period from an engine start to the termination of engine warm-up, the flag ATSstate is set at 0 (ATSstate=0), so that air/fuel ratio (air multiple rate) λ is maintained generally at 1. This setting derives a temperature increasing engine operation.

After the warm-up operation of engine 1 finishes, control unit 30 sets the flag ATSstate at 1 indicative of a normal diesel operation mode so that air/fuel ratio λ is set to be greater than or equal to 1.4 (λ≧1.4) to execute a lean burn operation. When NOx trap quantity of NOx trap catalyst element 17 becomes greater than a predetermined quantity, the flag ATSstate is set at 2 (ATSstate=2) so that air/fuel ratio λ is set generally at 0.9 to execute the rich spike control. During this control period, the first deterioration diagnosis is executed.

Sulfur (S) poisoning canceling operation, which is an operation of maintaining the air/fuel ratio at the stoichiometric air/fuel ratio and of increasing a catalyst temperature to be higher than 700° C., is periodically executed before the catalystic performance of NOx trap catalyst element 17 deteriorates due to the adsorption of sulfur (S). Therefore, when the S poisoning canceling demand is generated, control unit 30 sets flag ATSstate at 3 (ATSstate=3) so that the temperature of catalyst 17 is increased by executing the stoichiometric air/fuel ratio operation. Subsequently, after the temperature of the catalyst becomes sufficiently high, control unit 30 sets flag ATSstate at 4 (ATSstate=4) so that the air/fuel ratio λ is set generally at 0.99 (slightly rich state) to execute the S poisoning canceling operation.

When exhaust particulate contaminants deposited on DPF 18 are combusted (by setting air/fuel ratio λ at a value greater than 1.0 and increasing the catalyst temperature to be higher than 600° C., Control unit 30 first sets flag ATSstate at 3 (ATSstate=3) so that the temperature of DPF 18 is increased by executing the stoichiometric air/fuel ratio control. Subsequently when the temperature of DPF 18 becomes sufficiently high, control unit 30 sets flag ATSstate at 5 (ATSstate=5) so that the DPF recovery operation is executed by maintaining the air/fuel ratio λ generally at 1.2 (λ≈1.2).

In addition, when the temperatures of catalyst 17 and DPF 18 become higher than a predetermined high temperature and there is fear of damage by fire, control unit 30 sets ATSstate at 6 to execute an operation for avoiding such damage-by-fire for a predetermined time. Thereafter, the operation returns to a normal operation.

Therefore, at step S4 of the flowchart in FIG. 6, control unit 30 sets the flag ATSstate at 3 (ATSstate=3) in order to execute the second deterioration diagnosis under the condition of the stoichiometric air/fuel ratio.

FIG. 8 shows the flowchart of the first deterioration diagnosis executed at step S2 of the flowchart in FIG. 6, and FIG. 9 shows the situation of the first deterioration diagnosis.

At step S11 in FIG. 8, control unit 30 determines whether or not HC quantity HC_F at an upstream side of NOx trap catalyst element 17 is smaller than a predetermined value SL_HC_SF# in order to check whether the rich burn control is being executed.

At step S12 control unit 30 determines whether or not HC quantity HC_R at an downstream side of NOx trap catalyst element 17 is smaller than a predetermined value SL_HC_SR1# in order to check whether the rich burn control is being executed. The calculation of HC quantity (Hydro Carbon quantity) is executed on the basis of an output of the air/fuel ratio sensor. The detailed explanation thereof is discussed later.

When both of the determinations at steps S11 and S12 are affirmative (true), the program proceeds to step S13 wherein control unit 30 sets exhaust aftertreatment diagnosis execution flag F_OBD_ATS is set at true (F_OBT_ATS=True). Thereafter, the program proceeds to step S14. When either the determination at step S11 or the determination at step S12 is negative (False), the program proceeds to step S23 wherein control unit 30 sets the flag F_OBD_ATS at False (F_OBD_ATS=False). Then, the present routine is terminated.

At step S14 control unit 30 calculates HC integral quantity KOBDHC, which is a difference between the upstream side HC quantity HC_F and downstream side HC quantity HC_R using the following expression (1).

$$KOBDHC = KOBDHC_{n-1} + (HC\_F - HC\_R) \quad (1)$$

At step S15 control unit 30 determines whether or not downstream side HC quantity HC_R is smaller than a predetermined quantity SL_HC_SR2# to determine whether or not the stoichiometric air/fuel ratio maintaining period is terminated.

At step S16 control unit 30 determines whether or not the difference |HC_F−HC_R| is smaller than a predetermined value KDHC# to determine whether or not the diagnosis was executed under the normal condition.

When both of the determinations at steps S15 and S16 are affirmative (True), the program proceeds to step S17. When either the determination at step S15 or the determination at step S16 is negative (False), the program proceeds to step S22 wherein control unit 30 brings the first deterioration diagnosis result F_ATS_NG1 into a previous diagnosis result F_ATS_NG1$_{n-1}$ (F_ATS_NG1=F_ATS_NG1$_{n-1}$). Then the present routine is terminated.

At step S17 control unit 30 determines the final HC integral quantity KOBDF (KOBDF=KOBDHC$_{n-1}$). At step S18 control unit 30 clears the hitherto HC integral quantity KOBDHC (KOBDHC=0).

At step S19 control unit 30 determines whether or not the final HC integral quantity KOBDF is greater than a predetermined diagnosis threshold KOBDFSL#. When the determination at step S19 is affirmative, the program proceeds to step S20 wherein control unit 30 determines that the catalyst 17 is normal and sets first deterioration diagnosis result flag F_ATS_NG1 at False (F_ATS_NG1=False). Thereafter the present routine is terminated. When the determination at step S20 is negative (False), the program proceeds to step S21 wherein control unit 30 determines that the catalyst 17 is abnormal and sets first deterioration diagnosis result flag F_ATS_NG1 at True (F_ATS_NG1=True). Thereafter, the present routine is terminated.

Figure 11:
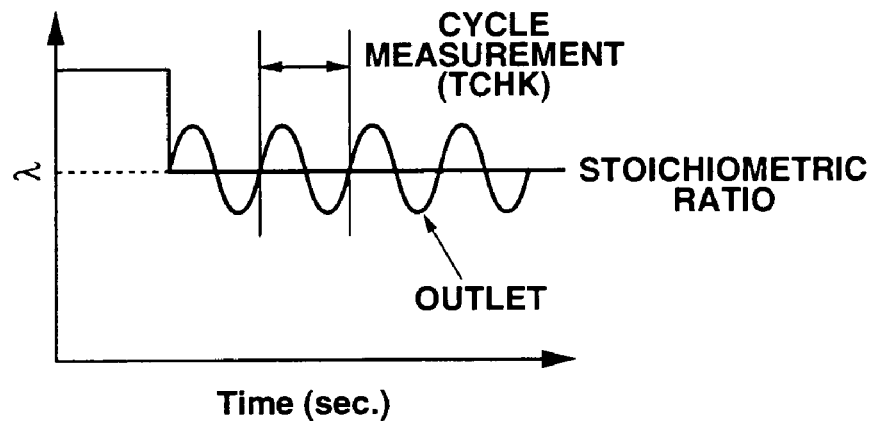
FIG. 11 is a graph explaining the second deterioration diagnosis of FIG. 10.

FIG. 10 is a flowchart of the second deterioration diagnosis execute at step S5 of the flowchart shown in FIG. 6, and FIG. 11 shows a concrete operation of the second deterioration diagnosis.

At step S31 control unit 30 determines whether the exhaust aftertreatment demand flag ATSstate is 3 or 4 to determine whether the engine operating condition is in the vicinity of the stoichiometric air/fuel ratio.

At step S32 control unit 30 determines whether or not the air/fuel ratio Rlambr is converging at the target air/fuel ratio by checking whether an absolute value |Rlambr−1| is smaller than KLAMCM#.

When both of the determinations at step S31 and S32 are affirmative (True), the program proceeds to step S33. When either the determination at step S31 or the determination at step S32 is negative (False), the present routine is terminated.

At step S33 control unit 30 reads an inversion cycle TCHK of the air/fuel ratio feedback control and determines whether or not the inversion cycle TCHK is smaller than a diagnosis threshold SL_TCHK#. When the determination at step S33 is affirmative (True), the program proceeds to step S34 wherein control unit 30 determines that the catalyst is abnormal. Thereafter, the present routine is terminated. When the determination at step S33 is negative (False), the program proceeds to step S35 wherein control unit 30 sets second deterioration diagnosis result flag F_ATS_NG2 at False (F_ATS_NG2=False). Thereafter the present routine is terminated.

Figure 12:
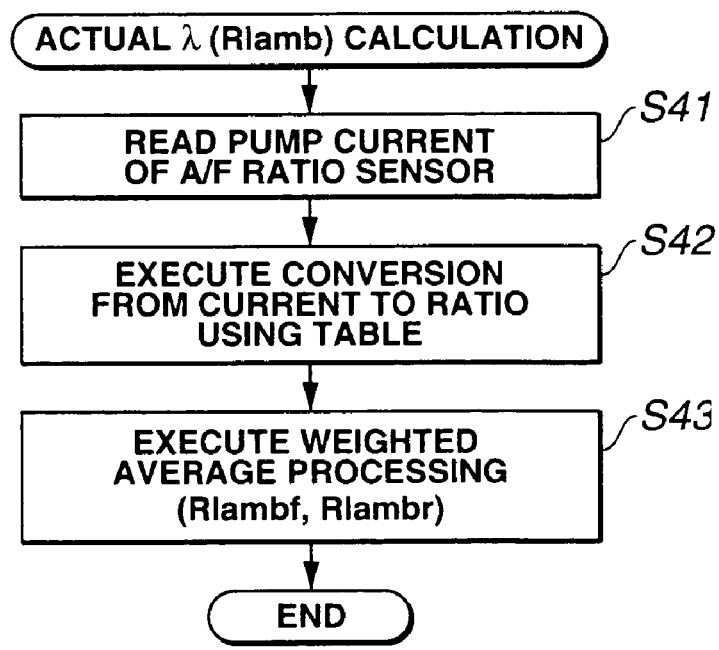
FIG. 12 is a flowchart showing an actual air/fuel ratio calculation process.

FIG. 12 shows a flowchart for calculating actual air/fuel ratio (actual λ) from an output of a wide range type air/fuel ratio sensor. Both outputs of the upstream side and downstream side sensors for NOx trap catalyst element 17 are similarly employed to calculate the respective actual air/fuel ratios thereof.

Figure 13:
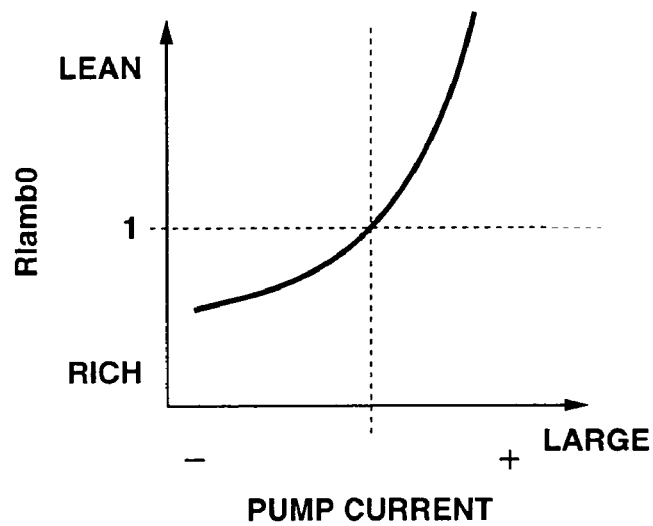
FIG. 13 is a table showing a relationship between a pump current and the air/fuel ratio.

At step S41 control unit 30 reads a pump current of each air/fuel ratio sensor. At step S42 control unit 30 converts the pump current into the actual air/fuel ratio Rlamb0 using a table shown in FIG. 13. At step S43 control unit 30 obtains the final air/fuel ratios (upstream side air/fuel ration Rlambf and downstream side air/fuel ratio Rlambr) by executing a weighted average processing.

Figure 14:
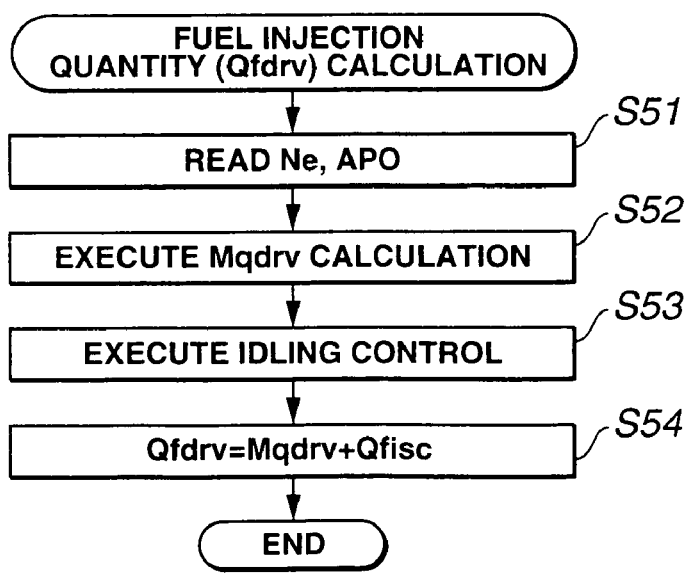
FIG. 14 is a flowchart showing a fuel injection quantity calculation process.

FIG. 14 shows a flowchart employed for calculating a target acceleration demand fuel injection quantity Qfdrv.

Figure 15:
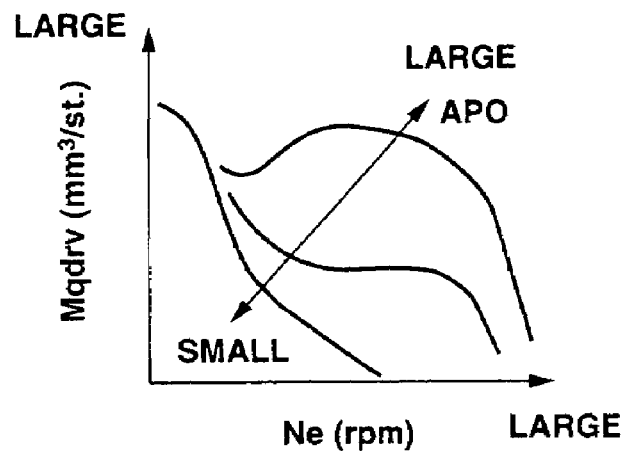
FIG. 15 is a map showing a fuel injection characteristic.

At step S51 control unit 30 reads engine speed Ne and accelerator opening APO. At step S52 control unit 30 retrieves a basic fuel injection quanity Mqdrv from a map shown in FIG. 15 on the basis of engine speed Ne and accelerator opening APO.

At step S53 control unit 30 calculates an idling correction quantity Qfisc for an idling speed control. At step S54 control unit 30 obtains target acceleration demand fuel injection quantity Qfdrv by adding idling correction quantity Qfisc to basic fuel injection quantity Mqdrv. Thereafter, the present routine is terminated.

Figure 16:
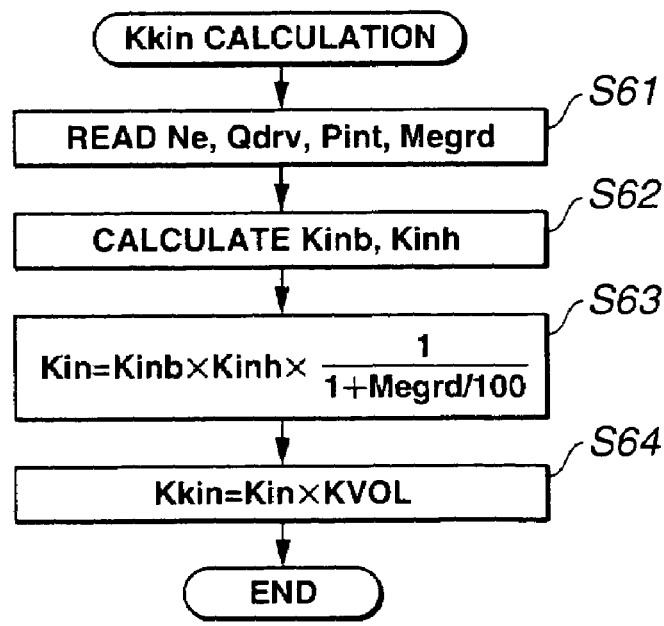
FIG. 16 is a flowchart showing an air intake system response time-constant calculation process.

FIG. 16 is a flowchart wherein a response time constant equivalent value Kkin of an air intake system.

At step S61 control unit 30 reads engine speed Ne, target acceleration demand fuel injection quantity Qfdrv, intake air pressure Pint and EGR ratio Megrd.

Figure 17:
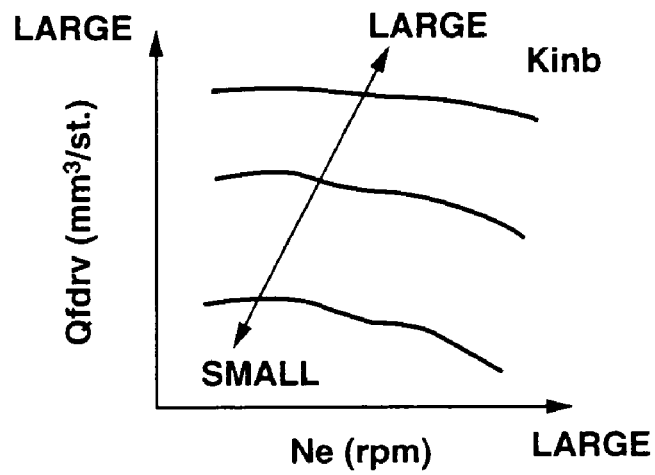
FIG. 17 is a map showing a volumetric efficiency.
Figure 18:
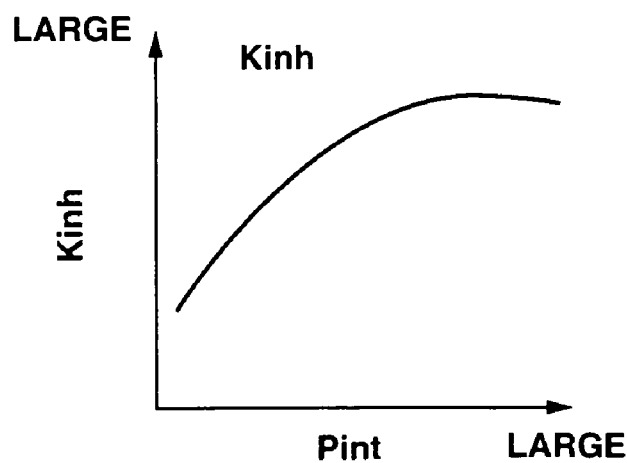
FIG. 18 is a table showing a volumetric efficiency correction value.

At step S62 control unit 30 calculates a volumetric efficiency basic value Kinb from engine speed Ne and target acceleration demand fuel injection quantity Qfdrv using a map shown in FIG. 17, and calculates volumetric efficiency intake pressure correction value Kinh from intake pressure Pint using a table shown in FIG. 18.

At step S63 control unit 30 calculates volumetric efficiency equivalent value Kin from volumetric efficiency basic value Kinb, volumetric efficiency intake pressure correction value Kinh and EGR ratio Megrd using the following expression (2).

$$Kin = Kinb \times Kinh \times 1/(1 Megrd/100) \quad (2)$$

At step S64 control unit 30 calculates a response time constant equivalent value Kkin of the air intake system by multiplying volumetric efficiency equivalent value Kin by a volume ratio KVOL. Thereafter, the present routine is terminated. Herein, volume ratio KVOL is a ratio (Vc/Vm) between an intake system volume Vm and a cylinder stroke volume Vc.

Figure 19:
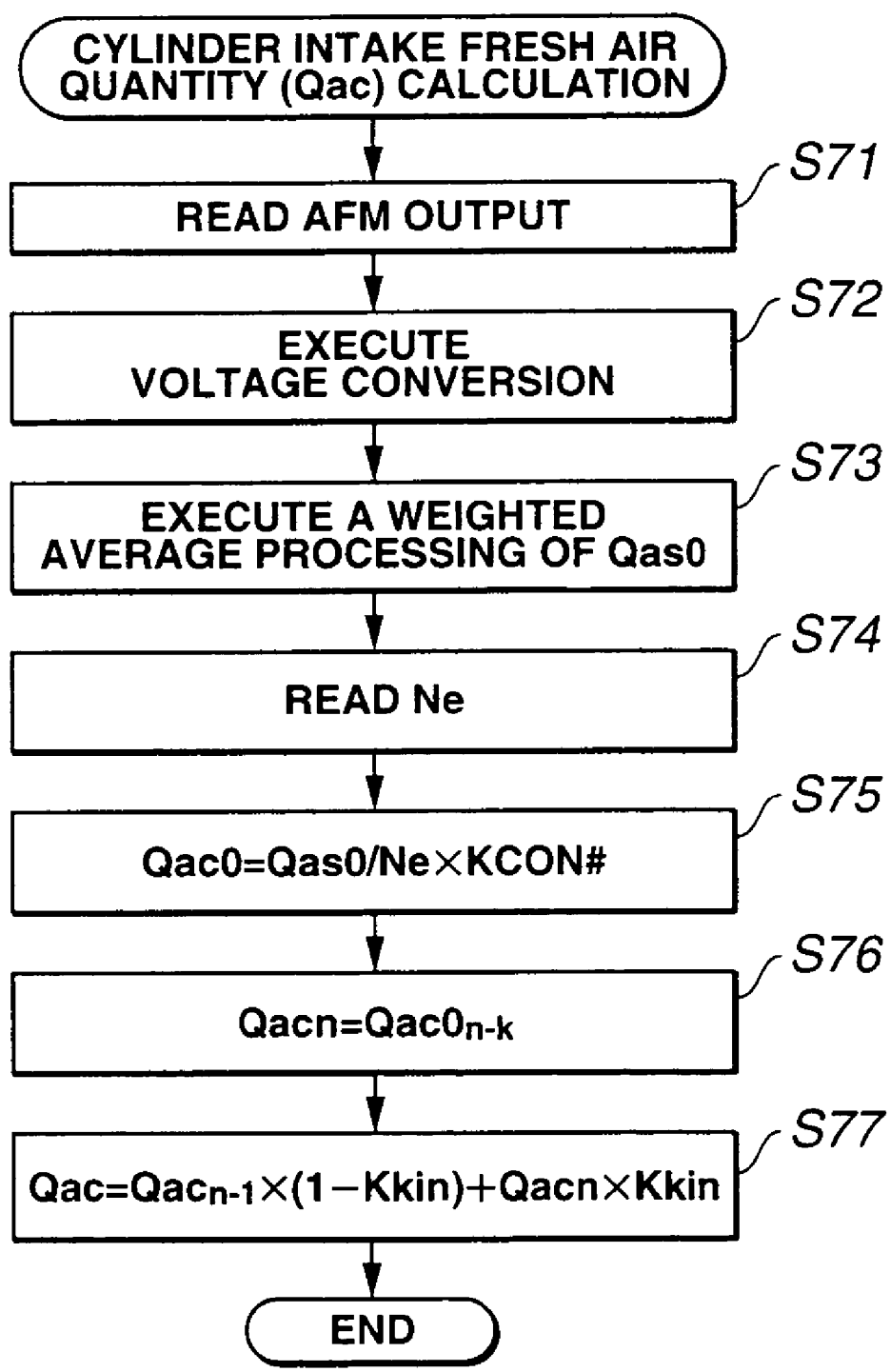
FIG. 19 is a flowchart showing a cylinder intake fresh air quantity calculation process.

FIG. 19 is a flowchart for calculating a cylinder intake fresh air quantity Qac.

Figure 20:
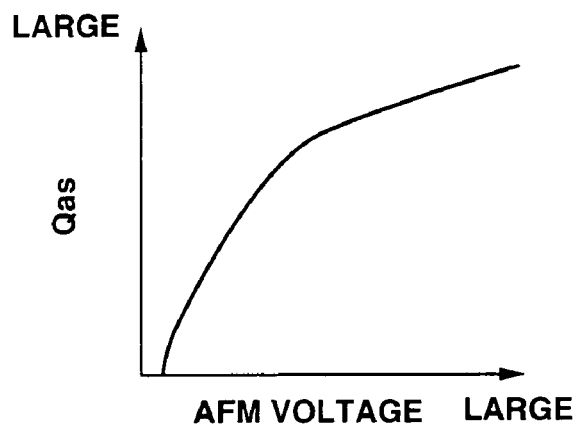
FIG. 20 is a table showing a relationship between an AFM voltage and an airflow rate.

At step S71 control unit 30 reads an output voltage of airflow meter (AFM). At step S72 control unit 30 converts the output voltage into an intake air quantity Qas using a table shown in FIG. 20. At step S73 control unit 30 executes a weighted average process of intake air quantity Qas to obtain a value Qas0.

At step S74 control unit 30 reads engine speed Ne. At step S75 control unit 30 calculates per-cylinder intake air quantity Qac0 from intake air quantity Qas0, engine speed Ne and a constant KCON# using the following expression (3).

$$Qac0 = Qas0/Ne \times KCON\# \quad (3)$$

At step S76 control unit 30 executes a delay processing of k-times calculations of per-cylinder intake air quantity Qac0 to obtain a collector inlet fresh air quantity Qacn=Qac0$_{n-k}$.

At step S77 control unit 30 calculates a cylinder intake fresh air quantity Qac by executing a delay processing from response time constant equivalent value Kin and collector inlet fresh air quantity Qacn using the following expression (4).

$$Qac=Qac_{n-1}\times(1-Kkin)+Qac_n\times Kkin \qquad (4)$$

Figure 21:
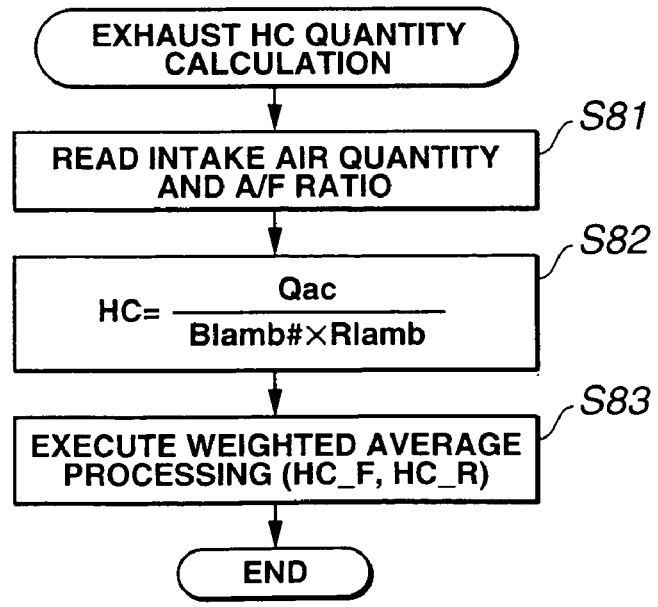
FIG. 21 is a flowchart showing an exhaust HC quantity calculation process.

FIG. 21 is a flowchart for calculating an exhaust system HC quantity (reducing agent quantity). Both outputs of the upstream side and downstream side sensors for NOx trap catalyst element 17 are similarly employed to calculate the respective exhaust system HC quantities thereof.

At step S81 control unit 30 reads cylinder intake fresh air quantity Qac, air/fuel ratio Rlamb (Rlambf and Rlambr).

At step S82 control unit 30 calculates HC quantity using the following expression (5).

$$HC=Qac/(Blmab\#\times Ralmb) \qquad (5)$$

where Blmab# is a constant.

At step S83 control unit 30 executes the weighted average processing of HC quantity obtained at step S82 to obtain the final HC quantity and sets the upstream side and downstream side HC quantity of NOx trap catalyst element as HC_F and HC_R, respectively.

With the thus arranged embodiment according to the present invention, the first deterioration diagnosis is executed under a normal engine operating condition wherein the exhaust ambience is changed to rich side or lean side, and diagnoses the deterioration of the exhaust aftertreatment apparatus from the detection result change between the first and second exhaust ambience detecting means respectively provided at the upstream side and the downstream side of the exhaust aftertreatment apparatus. When the result of the first deterioration diagnosis indicates that the deterioration of the exhaust aftertreatment apparatus is occurring, the second deterioration diagnosis is executed. In order to execute the second deterioration diagnosis, the engine operating condition is changed to a diagnosis operating condition. The second deterioration diagnosis is arranged to diagnose the exhaust aftertreatment apparatus from a change of the detection result of the second exhaust ambience detecting means. With a combination of the first and second deterioration diagnoses, the diagnosis system according to the present invention enables the improvement in diagnosis accuracy while suppressing the deterioration of fuel consumption.

With the thus arranged embodiment according to the present invention, since the first deterioration diagnosis is executed during the transition from lean burn operation to the rich burn operation (rich spike control) or the transition from the rich burn operation to the lean burn operation, the diagnosis of the exhaust aftertreatment apparatus is easily executed without deteriorating the engine performance.

Further, the first deterioration diagnosis is arranged to calculate the integral of a difference between the output of the first exhaust ambience detecting means and the output of the second exhaust ambience detecting means during a period from a first moment that the output of the first exhaust ambience detecting means varies to a predetermined value to a second moment that the output of the second exhaust ambience detecting means also varies to the predetermined value, and to diagnose the deterioration of the exhaust aftertreatment apparatus on the basis of the obtained integral quantity. This arrangement largely improves the accuracy of the diagnosis.

Figure 22A:
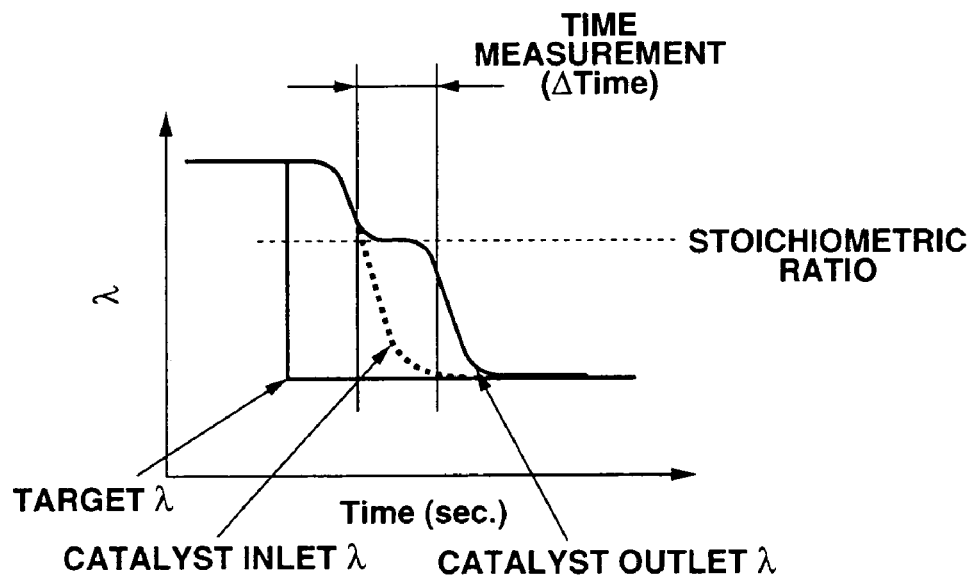
FIGS. 22A and 22B are graphs explaining the deterioration diagnosis using a time measurement.
Figure 22B:
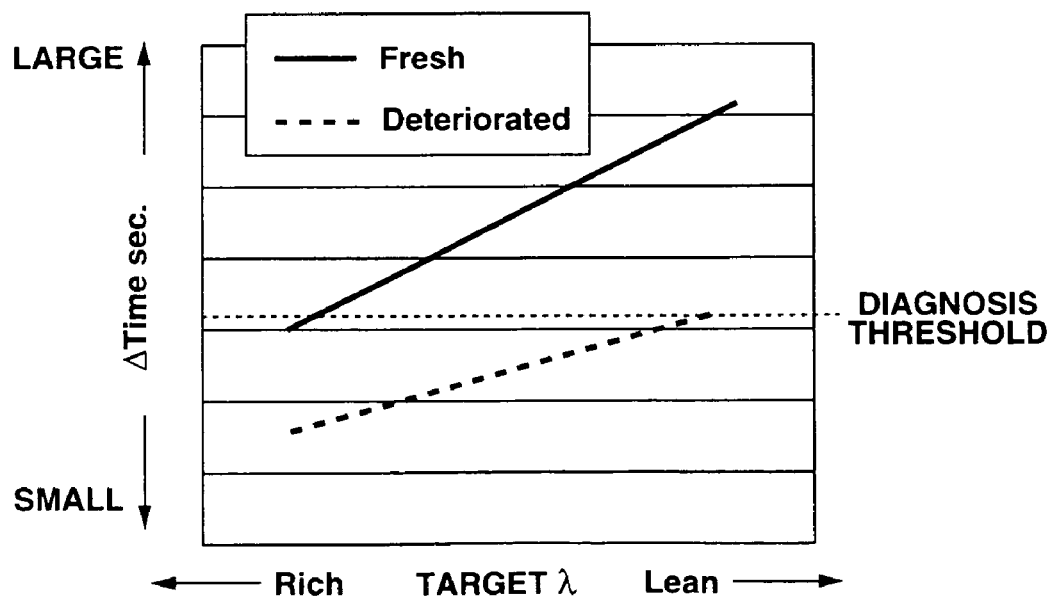

That is, in case that the deterioration of the catalyst is diagnosed by measuring a time period $\Delta T$ during which the downstream side air/fuel ratio (outlet $\lambda$) is maintained at ratios near the stoichiometric air/fuel ratio and by comparing the time period with a threshold, there is a possibility that the erroneous diagnosis is made for the reasons that the time period $\Delta T$ maintained at ratios near the stoichiometric air/fuel ratio varies if the control of the air/fuel ratio during the rich spike control fluctuates, as shown in FIGS. 22A and 22B.

Figure 23A:
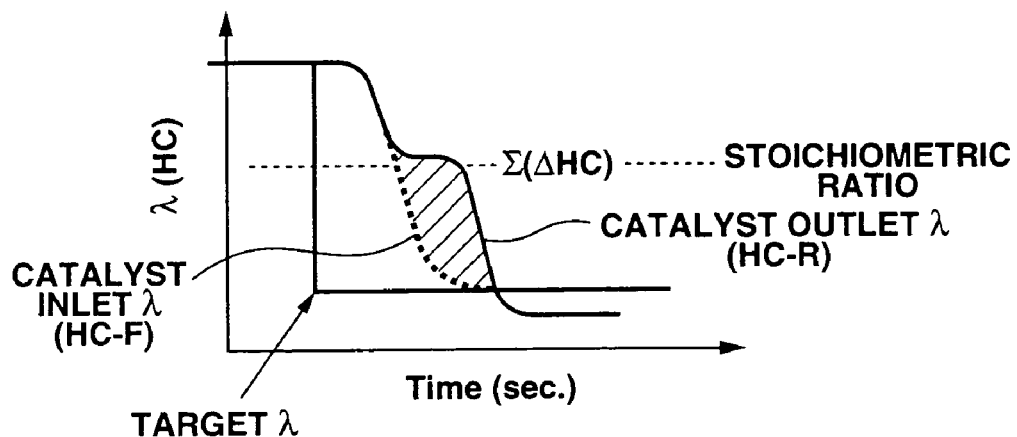
FIGS. 23A and 23B are graphs explaining the deterioration diagnosis using an integral quantity.
Figure 23B:
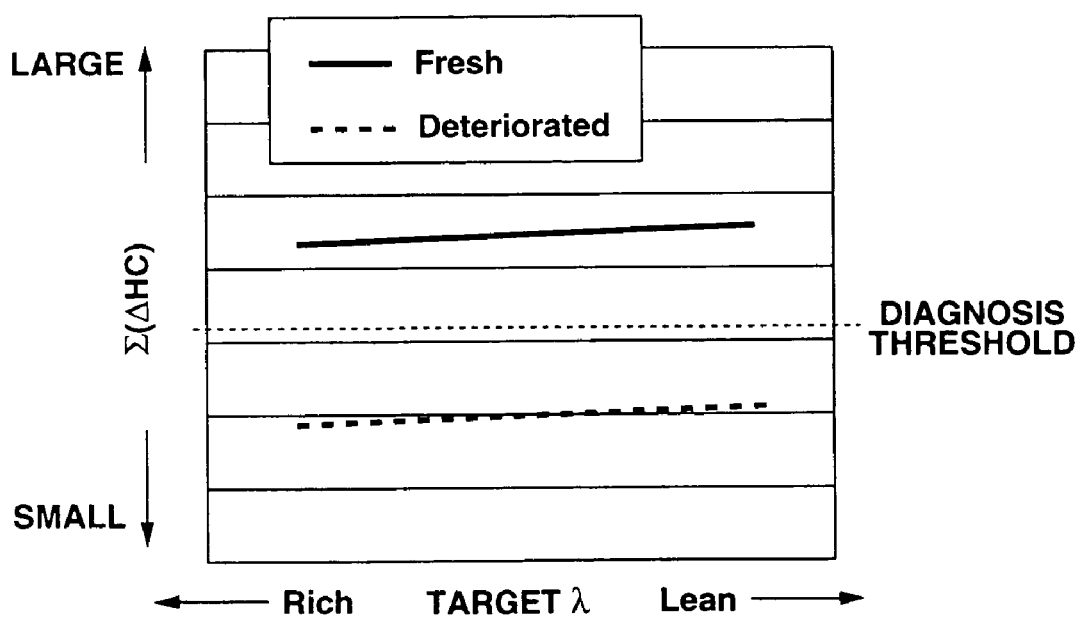

In contrast to this, the diagnosis method of calculating the integral quantity $\Sigma(\Delta HC)$ and diagnosing the deterioration of the exhaust aftertreatment apparatus on the basis of this integral quantity improves the accuracy of the diagnosis for the reasons that the fluctuation is small even if the control of the air/fuel ratio during the rich spike control fluctuates, as shown in FIGS. 23A and 23B.

Further, since the second deterioration diagnosis of the embodiment according to the present invention is arranged to execute the deterioration diagnosis by transiting the engine operation to the stoichiometric air/fuel ratio control, it becomes possible to accurately diagnose the deterioration of the exhaust aftertreatment apparatus.

Furthermore, the second deterioration diagnosis of the embodiments according to the present invention is arranged to execute the deterioration diagnosis by feedback controlling the exhaust air/fuel ratio at ratios near the stoichiometric air/fuel ratio on the basis of the output of the second exhaust ambience detecting means, by measuring the inversion cycle of the feedback quantity during the feedback control, and by diagnosing the deterioration of the exhaust aftertreatment apparatus on the basis of the inversion cycle. This arrangement enables the high-accuracy diagnosis.

By adapting the diagnosis system according to the present invention into the deterioration diagnosis of the exhaust aftertreatment apparatus attached to a compression ignition engine such as a diesel engine, the advantages of the diagnosis system is increased due to the separation of the diagnosis into two stages. That is, in case of a gasoline engine, at least in a high-load operation area, the engine is operated in the vicinity of the stoichiometric air/fuel ratio, and therefore, it is possible to firstly execute the diagnosis on the basis of the inversion cycle of the feedback quantity during the feedback quantity.

This application is based on Japanese Patent Application No. 2003-99656 filed on, Apr. 2, 2003 in Japan. The entire contents of this Japanese Patent Application are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. An exhaust-aftertreatment-apparatus diagnosis system for an internal combustion engine, comprising:
   an exhaust ambience varying section varying a ratio between an oxidizing agent and a reducing agent in exhaust gas of the engine;
   an exhaust aftertreatment apparatus disposed in an exhaust passage of the engine, the exhaust aftertreatment apparatus selectively executing an adsorbing operation and a reducing operation of the exhaust gas according to the ratio;

a first exhaust ambience detector disposed upstream of the exhaust aftertreatment apparatus, the first exhaust ambience detector detecting a first ratio between the oxidizing agent and the reducing agent of the exhaust gas upstream of the exhaust aftertreatment apparatus;

a second exhaust ambience detector disposed downstream of the exhaust aftertreatment apparatus, the second exhaust ambience detector detecting a second ratio of the oxidizing agent and the reducing agent of the exhaust gas downstream of the exhaust aftertreatment apparatus;

a first deterioration diagnosing section diagnosing a deterioration of the exhaust aftertreatment apparatus on the basis of the first and second ratios obtained during an engine operating condition change from a lean burn operation to a rich burn operation or from the rich burn operation to the lean burn operation; and a second deterioration diagnosing section diagnosing the deterioration of the exhaust aftertreatment apparatus on the basis of the second ratio obtained by transiting the engine operating condition to a stoichiometric air/fuel ratio operating condition, when the first deterioration diagnosing section diagnoses that the exhaust aftertreatment apparatus is deteriorated.

2. The diagnosis system as claimed in claim 1, wherein the first deterioration diagnosing section comprises an integral section for calculating an integral quantity of a difference between an output of the first exhaust ambience detector and an output of the second exhaust ambience detector from a first moment that the output of the first exhaust ambience detector is varied to a predetermined value to a second moment that the output of the second exhaust ambience detector is varied to the predetermined value, and the first deterioration diagnosing section diagnoses the deterioration of the exhaust aftertreatment apparatus on the basis of the integral quantity.

3. An exhaust-aftertreatment-apparatus diagnosis system for an internal combustion engine, comprising:

an exhaust ambience varying section varying a ratio between an oxidizing agent and a reducing agent in exhaust gas of the engine;

an exhaust aftertreatment apparatus disposed in an exhaust passage of the engine, the exhaust aftertreatment apparatus selectively executing an adsorbing operation and a reducing operation of the exhaust gas according to the ratio;

a first exhaust ambience detector disposed upstream of the exhaust aftertreatment apparatus, the first exhaust ambience detector detecting a first ratio between the oxidizing agent and the reducing agent of the exhaust gas upstream of the exhaust aftertreatment apparatus;

a second exhaust ambience detector disposed downstream of the exhaust aftertreatment apparatus, the second exhaust ambience detector detecting a second ratio of the oxidizing agent and the reducing agent of the exhaust gas downstream of the exhaust aftertreatment apparatus;

a first deterioration diagnosing section diagnosing a deterioration of the exhaust aftertreatment apparatus on the basis of the first and second ratios obtained under a first engine operating condition when the exhaust ambience is changed; and a second deterioration diagnosing section diagnosing the deterioration of the exhaust aftertreatment apparatus on the basis of the second ratio obtained by transiting the engine operating condition to a stoichiometric air/fuel ratio operating condition, when the first deterioration diagnosing section diagnoses that the exhaust aftertreatment apparatus is deteriorated.

wherein the second deterioration diagnosing section comprises an exhaust air/fuel ratio feedback controlling section for feedback controlling the exhaust air/fuel ratio at ratios near the stoichiometric air/fuel ratio on the basis of the output of the second exhaust ambience detector and a cycle measuring section for measuring a cycle of a feedback quantity during when a feedback control being executed by the exhaust air/fuel ratio feedback controlling section, and the second deterioration diagnosing section diagnoses the deterioration of the exhaust aftertreatment apparatus on the basis of the cycle.

4. The diagnosis system as claimed in claim 1, wherein the exhaust aftertreatment apparatus is attached to a compression ignition engine.

5. The diagnosis system as claimed in claim 1, wherein the first engine operating condition, under which the first deterioration diagnosing section diagnoses the deterioration of the exhaust aftertreatment apparatus, includes a rich spike control condition wherein the engine operating condition is temporally varied from a lean burn condition to a rich burn condition.

6. The diagnosis system as claimed in claim 1, wherein the second engine operating condition, under which the second deterioration diagnosing section diagnoses the deterioration of the exhaust aftertreatment apparatus, includes a stoichiometric air/fuel ratio control.

7. The diagnosis system as claimed in claim 1, wherein the exhaust aftertreatment apparatus selectively executes an adsorbing operation of nitrogen oxide in the exhaust gas and a reducing operation of the nitrogen oxide.

8. The diagnosis system as claimed in claim 1, wherein the first deterioration diagnosing section diagnoses the deterioration of the exhaust aftertreatment apparatus on the basis of the first and second ratios obtained after an operation for temporally varying the engine operating condition from a lean burn condition to a rich burn condition.

9. The diagnosis system as claimed in claim 1, wherein the exhaust aftertreatment apparatus comprises a NOx trap catalyst.

10. The diagnosis system as claimed in claim 9, wherein the exhaust aftertreatment apparatus further comprises a diesel particulate trap disposed downstream of the NOx trap catalyst.

11. The diagnosis system as claimed in claim 10, wherein the exhaust aftertreatment apparatus further comprises an oxidizing catalyst disposed upstream of the NOx trap catalyst.

12. The diagnosis system as claimed in claim 1, wherein the first deterioration diagnosing section diagnoses the deterioration of the exhaust aftertreatment apparatus on the basis of a change of a catalyst downstream side air/fuel ratio relative to a change of a catalyst upstream side air/fuel ratio during a rich spike control, and the second deterioration diagnosing section diagnoses the deterioration of the exhaust aftertreatment apparatus from an inversion cycle of a feedback quantity during the feedback control of the catalyst downstream side air/fuel ratio during a stoichiometric control when the first deterioration diagnosis made a deterioration determination.

13. A method of diagnosing an exhaust aftertreatment apparatus for an internal combustion engine, the exhaust aftertreatment apparatus being disposed in an exhaust passage of the engine and purifying exhaust gas of the engine according to a ratio between an oxidizing agent and a reducing agent in the exhaust gas, which is varied by an exhaust ambience varying section, the method comprising:

detecting a first ratio between the oxidizing agent and the reducing agent of the exhaust gas upstream of the exhaust aftertreatment apparatus;

detecting a second ratio of the oxidizing agent and the reducing agent of the exhaust gas downstream of the exhaust aftertreatment apparatus;

executing a first diagnosis for diagnosing a deterioration of the exhaust aftertreatment apparatus on the basis of the first and second ratios obtained during an engine operating condition change from a lean burn operation to a rich burn operation or from the rich burn operation to the lean burn operation; and executing a second diagnosis for diagnosing the deterioration of the exhaust aftertreatment apparatus on the basis of the second ratio obtained by transiting the engine operating condition to a stoichiometric air/fuel ratio operating condition, when the first deterioration diagnosing section diagnoses that the exhaust aftertreatment apparatus is deteriorated.

14. An exhaust-aftertreatment-apparatus diagnosis system for an internal combustion engine, comprising:

exhaust ambience varying means for varying a ratio between an oxidizing agent and a reducing agent in exhaust gas of the engine;

exhaust aftertreatment means for purifying the exhaust gas by selectively executing an adsorbing operation and a reducing operation of the exhaust gas according to the ratio varied by the exhaust ambience varying means, the exhaust aftertreatment means being disposed in an exhaust passage of the engine;

first exhaust ambience detecting means for detecting a first ratio between the oxidizing agent and the reducing agent of the exhaust gas upstream of the exhaust aftertreatment apparatus, the first exhaust ambience detecting means being disposed upstream of the exhaust aftertreatment apparatus;

second exhaust ambience detecting means for detecting a second ratio of the oxidizing agent and the reducing agent of the exhaust gas downstream of the exhaust aftertreatment apparatus, the second exhaust ambience detecting means being disposed downstream of the exhaust aftertreatment apparatus;

first deterioration diagnosing means for diagnosing a deterioration of the exhaust aftertreatment apparatus on the basis of the first and second ratios obtained during an engine operating condition change from a lean burn operation to a rich burn operation or from the rich burn operation to the lean burn operation; and second deterioration diagnosing means for diagnosing the deterioration of the exhaust aftertreatment apparatus on the basis of the second ratio by transiting the engine operating condition to a stoichiometric air/fuel ratio operating condition, when the first deterioration diagnosing means diagnoses that the exhaust aftertreatment apparatus is deteriorated.

\* \* \* \* \*